Feb. 18, 1936.  E. H. TAYLOR  2,031,138
METHOD OF WELDING
Filed March 17, 1934
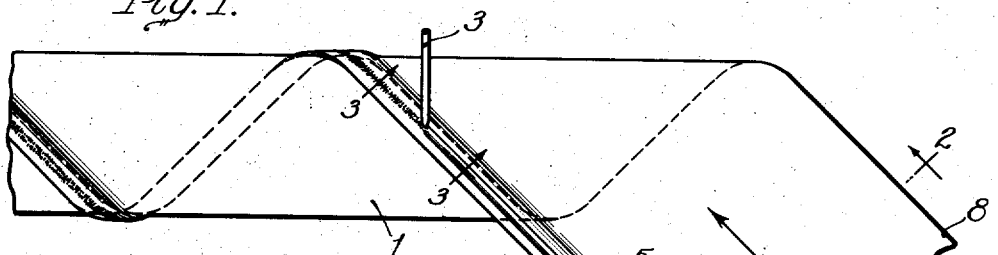
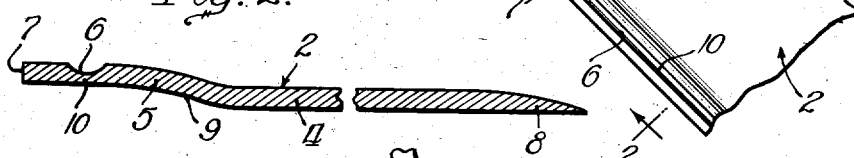
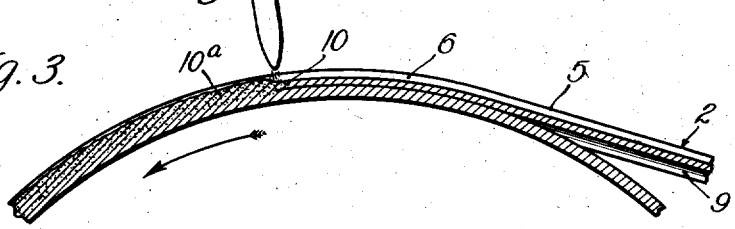
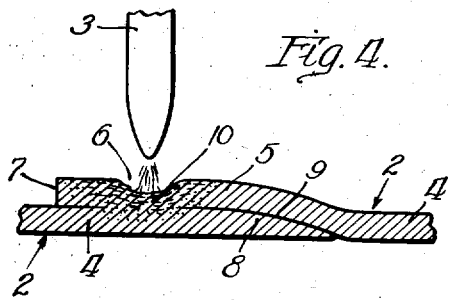 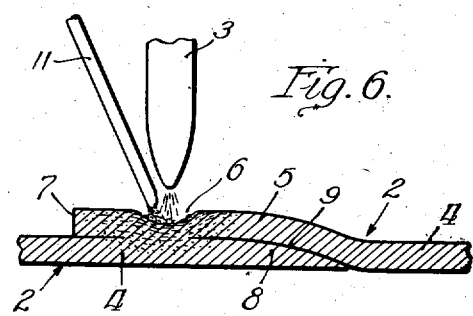
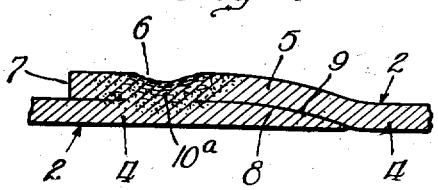 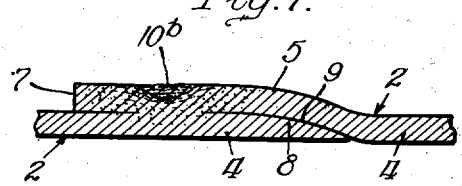
Inventor:
Edward Hall Taylor
By: Brown, Jackson, Boettcher & Dienner,
Attys.

Patented Feb. 18, 1936

2,031,138

UNITED STATES PATENT OFFICE 2,031,138

METHOD OF WELDING

Edward Hall Taylor, Oak Park, Ill.

Application March 17, 1934, Serial No. 716,057

6 Claims. (Cl. 113—35)

This invention relates to the production of pipe and like tubular metal articles by welding, and has to do more particularly with the method of welding.

The method of my invention is especially suited for use in the production of tubular structures, such as pipes and the like, from metal strip by winding the strip spirally and welding together the convolutions of the wound strip, though, in its broader aspects, it can be used to advantage for other purposes. It is known to wind metal strip spirally and edge-weld together the convolutions of the wound strip to form pipe and like tubular articles. In forming pipe in this manner care must be exerted to assure that the weld is continuous and unbroken throughout, particularly if the pipe is to be used for conducting fluid under appreciable pressure. Any breaks or weakness in the weld renders the pipe unfit for the use intended. This necessity for care makes imperative the employment of operatives of exceptional skill, and the welding operation is necessarily performed at low speed, all of which adds materially to the cost of production.

Pipe used in handling fluids under high pressures must be made of thick metal to withstand the severe stresses to which it is subjected. This pipe may be produced by spirally winding metal strip and edge-welding together the convolutions of the wound strip, as above. It is also known to produce such pipe by winding thick metal strip spirally with the leading edge portion of each convolution overlapping the following edge portion of the next preceding convolution so as to form a lap joint therewith, and to edge-weld the overlap of the joint to the underlap. The use of heavy or thick metal strip introduces difficulties with respect to the welding operation which have proven to be quite serious in practice. When the convolutions of the wound strip are edge-welded together it is necessary, in order to assure a reliable weld, that the heat penetrate the entire thickness of the adjacent edge portions of the convolutions of the wound strip, while avoiding burning of the metal. This inevitably slows down the welding operation. Where the strip is wound so as to provide lap joints between adjacent convolutions, great care is required to avoid objectionable burning of the leading edge of the overlap or the burning of a hole through the underlap in heating the edge of the overlap and the adjacent portion of the underlap to proper welding temperature. This also means that the welding operation must be performed at low speed and care must be exerted to have the weld continuous and unbroken throughout.

I have found that there are certain advangages, of considerable value from the practical standpoint, in winding the metal strip so as to provide a lap joint between the adjacent convolutions and welding the overlap of this joint to the underlap along a line spaced inward from the leading edge of the overlap. In a pipe produced in this maner the portions of the overlap at the sides of the line of the weld constitute, in effect, collars which extend around the underlap and are shrunk tightly thereabout as the metal cools after the welding operation. These collars form fluid-tight closures about the underlap at opposite sides of the weld, the inner one of which is effective to prevent leakage in the event the weld is defective or broken at any point, these collars also serving as reenforcing elements for the pipe and the joints thereof. In producing a pipe in this manner, particularly if heavy or thick metal strip is used, appreciable time is required for the heat to penetrate the full thickness of the overlap and to heat the underlap to proper welding temperature. This method is, therefore, open to the objection that the welding operation has to be performed at low speed if the thickness of the overlap along the line of weld is the same as that of the remainder of the strip. My invention is directed primarily to providing a method whereby the welding operation may be performed at high speed in the production of a pipe or tubular article formed from metal strip wound spirally to provide lap joints between the adjacent convolutions of the wound strip, while assuring a continuous and unbroken weld. While my invention is particularly suitable for use with material of heavy gauge, it can also be used to advantage with material of lighter gauge. Further objects and advantages of my invention will appear from the detailed description.

In the drawing:

Figure 1 is a fragmentary plan view, illustrating the method of my invention, of a pipe formed from metal strip spirally wound to provide lap joints between adjacent convolutions of the wound strip;

Figure 2 is a section taken substantially on the line 2—2 of Figure 1 on an enlarged scale;

Figure 3 is a fragmentary section taken substantially on the line 3—3 of Figure 1 on an enlarged scale;

Figure 4 is a fragmentary sectional view through a lap joint of the pipe illustrating the method of welding in accordance with my invention;

Figure 5 is a view similar to Figure 4 but showing the completed weld;

Figure 6 is a fragmentary sectional view through a joint being welded in accordance with a modified form of my method; and Figure 7 is a view similar to Figure 6 but showing the completed weld.

Various machines are known in this art for winding metal strip spirally and welding the wound convolutions of the strip together to form pipe and like articles, and it is not necessary to illustrate or describe in detail any particular machine for performing this operation, in describing my invention. Suffice it to say that any suitable machine may be employed for winding the strip in the manner stated and advancing the pipe or like article as formed.

I have illustrated the method of my invention, by way of example, as used in the production of a pipe 1 or like tubular article from metal strip 2 which is wound spirally to form convolutions, the forward portion of each convolution overlying the rearward portion of the next preceding convolution and forming therewith a lap joint, the overlap being welded to the underlap by suitable means, comprising an electrode 3 beneath which the wound strip travels in such manner that the overlap is welded to the underlap along a line spaced inward from the leading edge of the overlap.

The metal strip 2 may be specially formed preliminary to its being passed through the forming and winding machine for producing the pipe or other tubular article. Conveniently, this metal strip is first passed through a rolling machine which shapes it so as to provide, at one side of body 4 of the strip, an offset portion 5 of appreciable width having in one face a trough-shaped groove 6 of considerable depth and disposed inward from outer edge 7 of the offset portion 5, this groove extending lengthwise of the strip and parallel to edge 7. The other side of the strip is tapered at 8 correspondingly to the curvature 9 at the inner side of the face of portion 5 opposite to groove 6. This groove 6 is of considerable depth, as noted, so that the metal between the bottom of the groove and the underface of strip 2, at 10, is much thinner than the metal of the strip at the sides of and adjacent the groove. While strip 2 is preferably formed in the manner described, in a rolling machine, any other suitable or preferred means may be employed for properly forming the strip, and the groove 6 may be of the particular shape illustrated or of any other suitable shape.

The strip 2, formed in the manner illustrated and described, is then passed through a suitable machine which serves to wind the strip spirally in such manner that the forward offset portion 5 of each convolution of the wound strip overlies the rearward portion of the next preceding convolution so as to form a lap joint therewith. As the strip is wound and the formed pipe or article 1 is advanced, trough 6 passes beneath the electrode 3 and the welding operation proceeds. Since the welding occurs along a line corresponding to the trough 6, the relatively thin area 10 of the overlap is subjected to the heat of the arc and the heat quickly penetrates through this relatively thin area of metal so as to fuse the same and heat the underlying portion of the underlap to welding temperature. This enables the welding operation to be performed at high speed, due to the provision of the thinned area of the metal strip 2 corresponding to the line of the weld, thus effecting a material saving in time, which is an important consideration. Furthermore, thinning of the metal at the area 10 assures that the heat readily penetrates the underlap to the proper depth to assure a continuous and mechanically strong weld between the overlap and the underlap. This will be clear from Figure 4. Preferably, though not necessarily, the electrode 3 is disposed adjacent the top of the pipe being formed, and to one side of the vertical plane of the axis thereof in the direction in which the formed pipe is rotated, as shown in Figure 3. The molten metal of the overlap flows toward previously molten and congealed metal of the overlap so as to be puddled thereby, thus assuring an effective union of the metal of the overlap and the metal of the underlap, which contributes to a highly efficient weld. During the welding operation the side walls of the trough 6 are heated by the arc and tend to cave in to a certain extent, the molten metal thus produced, together with the molten metal from the bottom of the trough, flowing toward the previously molten and congealed metal so as to be puddled thereby in the manner above described. As a result of the melting of the metal at the sides of the trough, the trough is filled in to a certain extent so that the thickness of the metal along the line of the completed weld is appreciably greater than the thinned area 10 of strip 2 before the welding operation, as shown at 10a in Figure 5. If desired, the trough 6 may be completely filled during the welding operation, by supplying additional metal to the trough in a suitable manner. In Figure 6 I have shown a metal rod 11 so disposed as to be subjected to the heat of the arc, the additional molten metal thus produced flowing into the trough so as to completely fill the latter, as indicated at 10b in Figure 7. The weld thus produced is of the same thickness as the adjacent portions of the metal strip 2 and is at least equal in mechanical strength to these portions of the strip. This provides an exceptionally strong weld which, if desired, may be ground down or smoothed off flush with the outer face of the overlap of the joint.

In the embodiment of my invention illustrated, the electrode 3 is a carbon electrode such as is commonly used in welding operations. If desired, a metallic electrode may be employed and the metal of this electrode utilized for filling in the trough 6, instead of the metal rod 11. Metal electrodes suitable for this purpose are known in the art and need not be illustrated nor described in detail, since the use of such an electrode in place of the carbon electrode 3 will be readily understood by those skilled in the art.

Since the area 10 of strip 2 is quite thin relative to the adjacent portion of the strip, the heat will readily penetrate this thin area thus eliminating danger of burning of the overlap, such as is apt to occur where excessive heat is employed. As above stated, the trough 6 may be of any suitable shape provided the required area of the strip is thinned to the desired extent.

My invention contemplates, in its broader aspects, thinning the area of the metal strip corresponding to the desired line of weld in any suitable manner and to the proper extent to permit of high speed welding, particularly when using relatively thick or heavy material. It will be understood, however, that the method of my invention is not limited to thick or heavy material, since it can be applied to advantage to material of any gauge commonly used in the production of pipe and like tubular articles. Tests have shown that by thinning the metal strip along the line of the weld to be made, in the manner described, the welding operation can be performed entirely satisfactorily at least three times as fast as is possible when the strip is not so thinned, for any given thickness of strip, depending more or less upon the extent to which the strip is thinned.

In the formed pipe, tapered portion 8 of the trip fits snugly into the curve 9 of portion 5 of the overlap so as to eliminate objectionable projections within the pipe. This is not essential, however, and the strip may be provided with the tapered portion 8 or not, as desired or as conditions may require. Also, while it is preferred to offset the forward portion of the strip, as at 5, this is not essential to the method of my invention and the strip may be otherwise suitably formed.

It is known in this art to form the pipe or like article first by rolling the metal strip spirally to form lap joints between the convolutions, the wound strip being secured together by suitably spaced tack welds or in any other suitable manner, and then secure the convolutions of the wound pipe together by welding performed as a separate operation from that of winding of the strip. I contemplate employing the method of my invention for welding a pipe or like article either during the winding of the metal strip, or after the metal strip has been wound into pipe form as above.

The forming of the groove in the forward portion of the metal strip preliminary to winding thereof into pipe form is not essential to my invention, though advantageous in certain cases. If desired, the metal strip may first be wound into pipe form, with the convolutions of the wound strip temporarily held against unwinding, after which the groove 10 may be formed in the forward portion of the strip along the line of the desired weld, by suitable means known in the art, and the convolutions of the wound strip may then be welded together along the line of the groove.

My invention comprehends the thinning of the metal of the overlap along the desired line of weld disposed away from the leading edge of the overlap, either before, during, or after winding of the metal strip spirally to form the pipe or like article, and welding the overlap to the underlap along this thinned area either during the winding of the strip or after the metal strip has been wound to form the pipe.

What I claim is:—

1. The method of producing tubing from metal strip by welding, which comprises providing the metal strip with a trough-like lengthwise groove in one face and spaced from one edge thereof, thereby rendering the grooved portion of said strip of materially less thickness than the adjacent portions thereof, winding the strip spirally into tubular form with the forward grooved portion of each convolution overlying the rearward portion of the next preceding convolution and forming therewith a lap joint in which the groove is disposed correspondingly to the desired line of weld and the grooved face of the strip is disposed outermost, subjecting the thinned portion of the overlap to heating means while imparting relative movement to said means and to the wound strip along said groove, thereby melting the thinned portion of the overlap along the groove and heating the underlying portion of the underlap to welding temperature, filling the groove by additional metal melted by the heating means, and flowing the molten metal of the overlap and the additional molten metal toward previously molten and congealed metal of the overlap and additional metal so as to be puddled thereby, thereby securing the overlap to the underlap by a line of welding corresponding to the thinned portion of said strip and of substantially the same thickness as the adjacent unthinned portions of the strip.

2. The method of producing tubing from metal strip by welding, which comprises providing the metal strip with a trough-like lengthwise groove in one face and spaced from one edge thereof, thereby rendering the grooved portion of said strip of materially less thickness than the adjacent portions thereof, winding the strip spirally into tubular form with the forward grooved portion of each convolution overlying the rearward portion of the next preceding convolution and forming therewith a lap joint in which the groove is disposed correspondingly to the desired line of weld and the grooved face of the strip is disposed outermost, subjecting the thinned portion of the overlap to heating means while imparting relative movement to said means and to the wound strip along said groove, thereby melting the thinned portion of the overlap along the groove and heating the underlying portion of the underlap to welding temperature, and filling the groove by additional metal melted by the heating means, thereby securing the overlap to the underlap by a line of welding corresponding to the thinned portion of said strip and of substantially the same thickness as the adjacent unthinned portions of the strip.

3. The method of producing tubing from metal strip by welding, which comprises providing the metal strip with a trough-like lengthwise groove in one face and spaced from one edge thereof, thereby rendering the grooved portion of said strip of materially less thickness than the adjacent portions thereof, winding the strip spirally into tubular form with the forward grooved portion of each convolution overlying the rearward portion of the next preceding convolution and forming therewith a lap joint in which the groove is disposed correspondingly to the desired line of weld and the grooved face of the strip is disposed outermost, subjecting the thinned portion of the overlap to heating means while imparting relative movement to said means and to the wound strip along said groove, thereby melting the thinned portion of the overlap along the groove and heating the underlying portion of the underlap to welding temperature, and flowing the molten metal of the overlap toward previously molten and congealed metal of said overlap so as to be puddled thereby, thereby securing the overlap to the underlap by a line of welding corresponding to the thinned portion of said strip.

4. The method of producing tubing from metal strip by welding, which comprises providing the metal strip with a trough-like lengthwise groove in one face and spaced from one edge thereof, thereby rendering the grooved portion of said strip of materially less thickness than the adjacent portions thereof, winding the strip spirally into tubular form with the forward grooved portion of each convolution overlying the rearward portion of the next preceding convolution and forming therewith a lap joint in which the groove is disposed correspondingly to the desired line of weld and the grooved face of the strip is disposed outermost, and subjecting the thinned portion of the overlap to heating means while imparting relative movement to said means and the wound strip along said groove, thereby melting the thinned portion of the overlap along the groove and heating the underlying portion of the underlap to welding temperature and forming a line of welding securing said overlap and said underlap together and corresponding to the thinned portion of said strip.

5. The method of producing tubing from metal strip by welding, which comprises providing the metal strip with a lengthwise groove spaced from one edge thereof, the grooved portion of the strip being materially thinner than the adjacent ungrooved portions thereof, winding the strip spirally into tubular form with the forward grooved portion of each convolution overlying the rearward portion of the next preceding convolution and forming therewith a lap joint, and welding the overlap of the joint to the underlap along said groove.

6. The method of producing tubing from metal strip by welding, which comprises providing the metal strip with a thinned area extending lengthwise of the strip and disposed inward from one edge thereof, said area being materially thinner than the adjacent unthinned portion of the strip, winding said strip spirally into tubular form with the forward thinned portion of each convolution overlying the rearward portion of the next preceding convolution and forming therewith a lap joint, and welding the overlap of the joint to the underlap along said thinned area of the overlap with the line of welding spaced inward of the overlap away from the leading edge of the latter.

EDWARD HALL TAYLOR.